(12) United States Patent
Murata et al.

(10) Patent No.: US 7,137,130 B2
(45) Date of Patent: Nov. 14, 2006

(54) PICKUP DEVICE WITH HEAT-RADIATING MECHANISM

(75) Inventors: Masaya Murata, Tokorozawa (JP); Yuichi Mizuuchi, Tokorozawa (JP); Masayuki Koyama, Tokorozawa (JP); Takehiko Hayashi, Tokorozawa (JP); Tsuyoshi Iwano, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 435 days.

(21) Appl. No.: 10/680,433

(22) Filed: Oct. 8, 2003

(65) Prior Publication Data

US 2004/0117810 A1      Jun. 17, 2004

(30) Foreign Application Priority Data

Oct. 8, 2002      (JP) ............................. 2002-294746

(51) Int. Cl.
*G11B 33/14*     (2006.01)
(52) U.S. Cl. .................................... 720/649
(58) Field of Classification Search ................ 720/659, 720/658, 671; 369/13.32
See application file for complete search history.

(56) References Cited

FOREIGN PATENT DOCUMENTS

| EP | 1 113 428 | 7/2001 |
|---|---|---|
| EP | 1 148 482 | 10/2001 |
| JP | 59-90241 | 5/1984 |
| JP | 60-117425 A * | 6/1985 |
| JP | 4-254983 A * | 2/1991 |
| JP | 9-219033 | 8/1997 |
| JP | 10-27367 | 1/1998 |
| JP | 2000-357340 | 12/2000 |
| JP | 2001-307372 A | 11/2001 |
| JP | 2004-423981 A * | 5/2004 |
| JP | 2004-192751 A * | 7/2004 |
| JP | 2005-78720 A * | 3/2005 |
| JP | 2005-78778 A * | 3/2005 |

OTHER PUBLICATIONS

European Search Report dated Nov. 22, 2004.
Patent Abstracts of Japan vol. 2000, No. 12, Jan. 3, 2001 & JP 2000 242953 A (Sony Corp), Sep. 8, 2000 *abstract*.
European Search Report dated Mar. 21, 2006.

* cited by examiner

*Primary Examiner*—Julie Anne Watko
(74) *Attorney, Agent, or Firm*—Armstrong, Kratz, Quintos, Hanson & Brooks, LLP (57) ABSTRACT

A laser light source (61) and a heat-radiating plate (71) are provided on a pickup base (51). The laser light source (61) irradiates a laser beam to an optical disk (41). The heat-radiating plate (71) has at least one part exposed outside the pickup base (51), having a predetermined distance between the heat-radiating plate (71) and the pickup base (51), and radiates heat generated by the laser light source (61). The plate (71) can radiate heat also from a surface opposing the pickup base (51) and can therefore have a high heat-radiating efficiency.

5 Claims, 6 Drawing Sheets

CONTACTING HEAT-RADIATING PLATE TO PICKUP BASE

FIG. 4B

PREDETERMINED DISTANCE BETWEEN HEAT-RADIATING PLATE AND PICKUP BASE

PICKUP DEVICE WITH HEAT-RADIATING MECHANISM

BACKGROUND OF THE INVENTION

1. Field of the Invention

The present invention relates to a pickup device that, for example, writes or reads data on and from, for example, an optical recording medium.

2. Description of Related Art

Various types of pickup devices are known which write or read data on and from an optical recording medium, e.g., optical disks such as DVDs (Digital Versatile Disks) and CDs (Compact Discs). Among these types of the pickup devices is one that radiates heat generated from a light source. A pickup device of this type includes a laser light source, a pickup base, and a heat-radiating unit. The laser light source is the light source for applying a light beam to an optical disk. The pickup base is a casing that contains the laser light source. The pickup device further includes optical elements. The optical elements are mounted on the pickup base. The optical elements are a beam splitter, a focusing lens, an optical detector, and the like. The beam splitter receives a laser beam emitted from the laser light source and reflects the laser beam toward an optical disk. The focusing lens focuses the laser beam. The optical detector detects a reflection light from the optical disk.

For example, the pickup base is made from metal material with high heat conductivity as the heat-radiating member that radiates the heat generated from the laser light source. If the pickup base is made of such metal, the heat generated by the laser light source is transmitted to the pickup base and radiated outside the device from the surface of the pickup base. Then, the heat does not accumulate in the laser light source. The laser light source is prevented from being deteriorated in the characteristics and shortened in the lifetime.

The heat-radiating member may be a heat-radiating plate with high heat conductivity that is adhered along the surface of the pickup base and abuts at one part thereof on the laser light source. A surface of the heat-radiating plate is adhered to the surface of the pickup base. In this case, the heat generated by the laser light source is transmitted to the heat-radiating plate and radiated outside the pickup device from the surface of the heat-radiating plate. By setting in close contact with the pickup base, the heat-radiating plate would not increase the size of the pickup device.

However, when the pickup base is made of metal material to function as a unit for radiating heat generated by the laser light source, the manufacturing cost of the pickup device will rise.

On the other hand, when the pickup base is made of synthetic resin that is less expensive than metal, and a heat-radiating plate for radiating heat generated by the laser light source is provided on the pickup base, the manufacturing cost will not increase. However, the pickup base made of synthetic resin cannot radiate heat from surface thereof, a radiating area will be only the surface of the heat-radiating plate which is exposed to the atmosphere. The heat-radiating efficiency is decreased due to the small heat-radiating area.

In recent years, laser light sources that can be used for both DVDs and CDs and laser light sources that can write data on optical disks have come into practical use. The amount of the heat from the laser light sources increases. The heat of the laser light source is not radiated sufficiently, since the laser light source has large amount of the heat but the pickup device has low heat-radiating efficiency.

SUMMARY OF THE INVENTION

An object of the present invention is to provide a pickup device that can radiate heat at high efficiency and can be made at low manufacturing cost.

The pickup device according to the present invention includes a casing, a light source, and a heat-radiating member. The light source is provided in the casing to irradiate a light beam to an optical recording medium. The heat-radiating member has at least one part exposed outside the casing. The heat-radiating member is spaced from the casing by a predetermined distance and configured to radiate heat generated by the light source.

DETAILED DESCRIPTION OF PREFERRED EMBODIMENT(S)

Embodiments of the present invention will be described below, with reference to accompanying drawings.

(First Embodiment)

Figure 1:
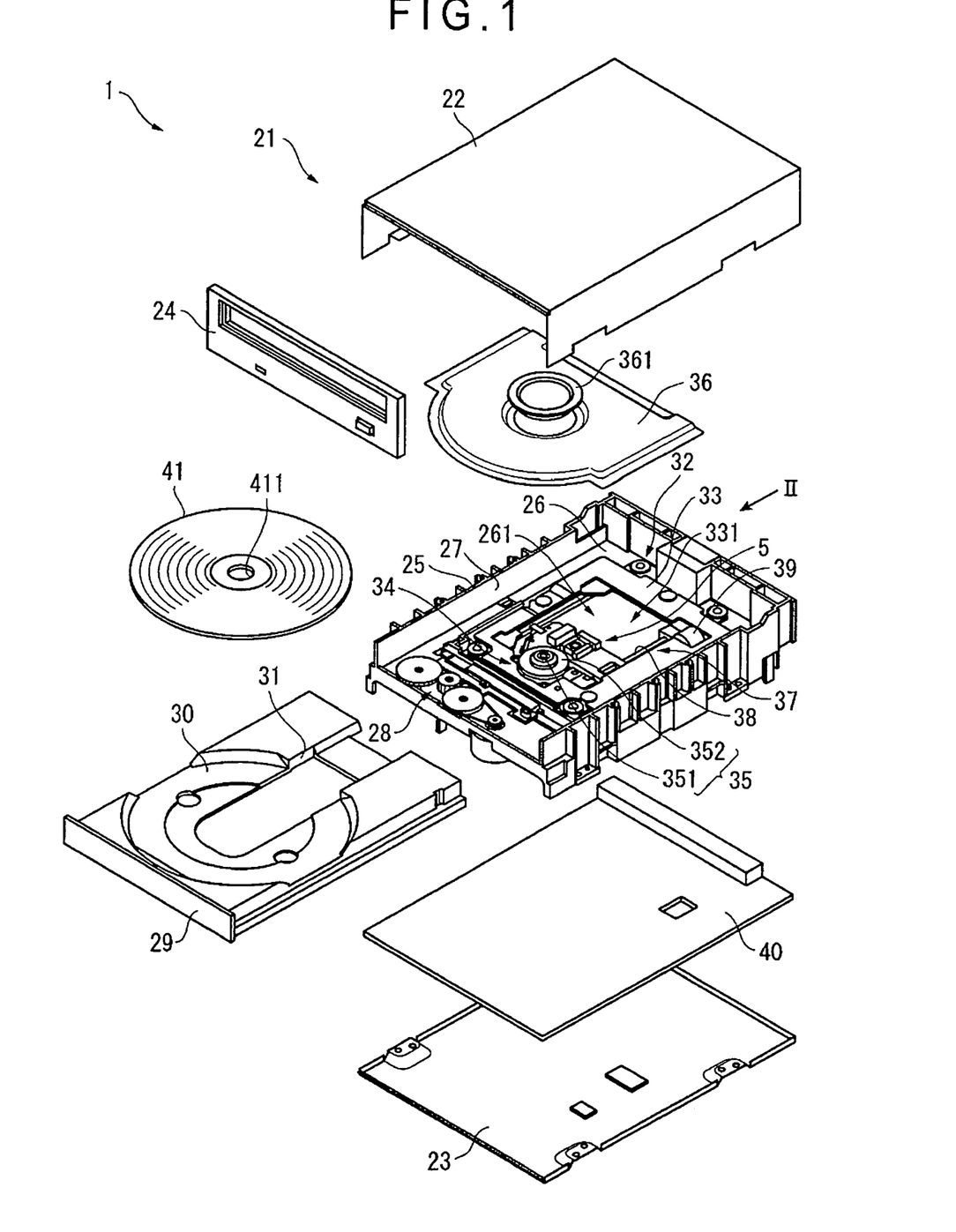
FIG. 1 is an exploded perspective view of a disk apparatus having a pickup device according to a first embodiment of the present invention.
Figure 2:
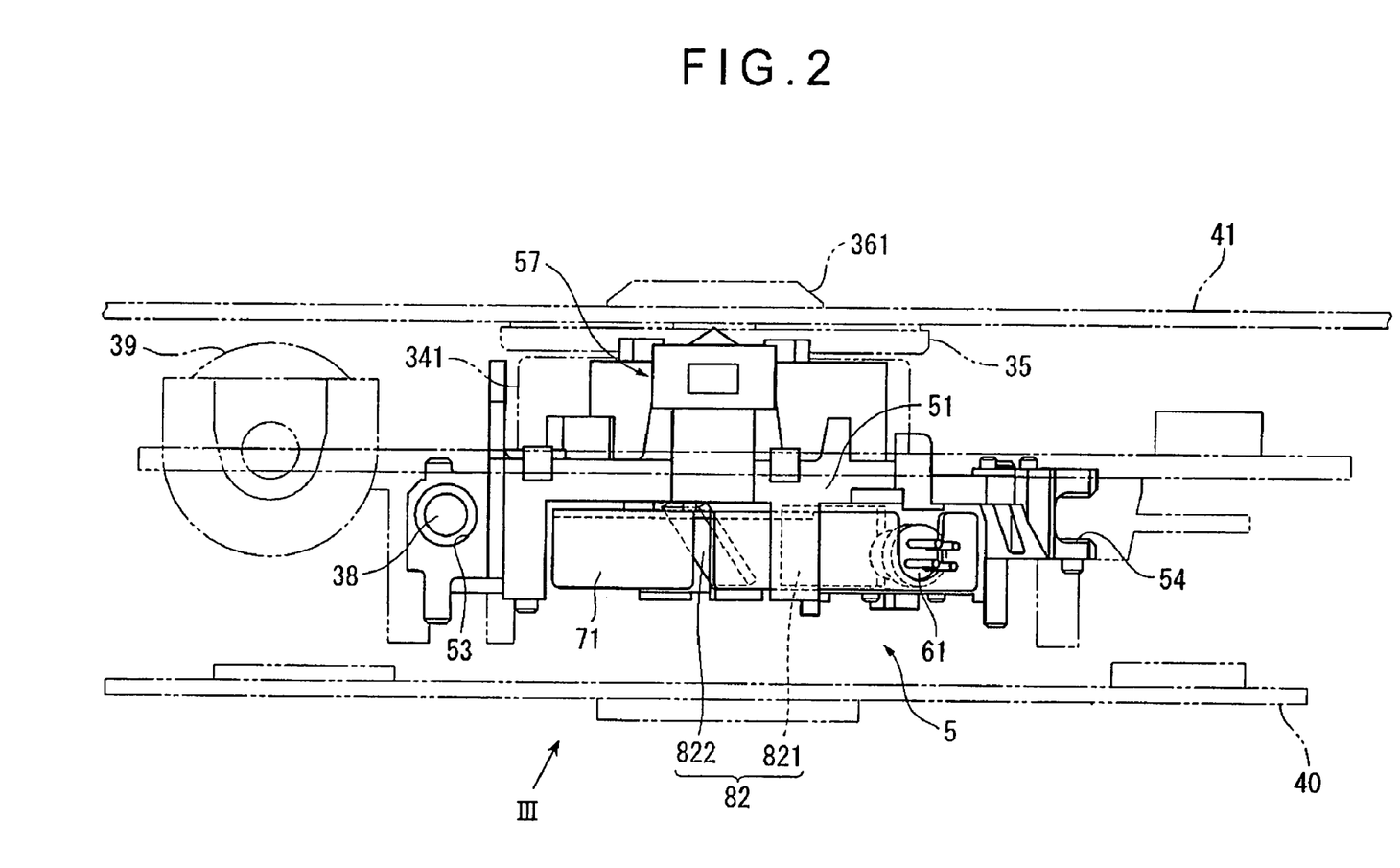
FIG. 2 is a side view showing the pickup device according to the first embodiment seen from a direction II shown in FIG. 1.

FIG. 1 is an exploded perspective view of a disk apparatus 1. The disk apparatus 1 incorporates a pickup device according to the first embodiment of the present invention. The disk apparatus 1 is designed to reproduce or record data from and on an optical disk. The optical disk may be a DVD or a CD. FIG. 2 is a side view of the disk apparatus seen from a direction II shown in FIG. 1, after assembling the disk apparatus of the FIG. 1.

The disk apparatus 1 includes an outer case 21, an inner case 25, a disk tray 29, a main unit 32, and a circuit board 40. The inner case 25 is provided inside the outer case 21. The disk tray 29 is provided to be advanceable and retractable relative to the inner case 25, and an optical disk 41 as an optical recording medium is set thereon. The main unit 32 is provided in the inner case 25 and configured to reproduce or record data from and on the optical disk 41. The circuit board 40 has electric component that control the main unit 32.

The outer case 21 includes an upper case 22, a lower case 23, and a decorative panel 24. The upper case 22 is opening at the bottom and front sides as shown in FIG. 1. The lower case 23 closes the bottom side of the upper case 22. The decorative panel 24 closes the front side of the upper case 22. Thus, the outer case 21 is, as a whole, a flat rectangular parallelepiped shape.

The inner case 25 opens at the upper and front side. It includes a bottom wall 26 and a side wall 27. The bottom wall 26 has an opening 261 made in the approximately center part. The side wall 27 stands from the bottom wall 26.

The disk tray 29 is shaped like a plate, having a tray recess 30, provided on the upper side thereof, like a circular concave whose diameter increases upward. The optical disk 41 is mounted on the tray recess 30. The disk tray 29 has an approximately rectangular opening 31 cut in the center part. The disk tray 29 is advanceable and retractable by a tray-driving unit 28 that is provided in the inner case 25.

The main unit 32 includes a base 33, a rotary drive 34, a pickup device 5, and a movement unit 37. The base 33 is provided in the inner case 25 and has an opening 331 made in the center part. The rotary drive 34 is provided in the base 33 and designed to rotate the optical disk 41. The pickup device 5, which moves the opening 331 of the base 33 from an edge to another edge, irradiates a laser beam to the recording part provided on a lower surface of the optical disk 41 and detects the reflection light from the optical disk 41. The movement unit 37 drives the pickup device 5.

The base 33 is shaped like a flat frame, and positioned as the opening 331 of the base 33 is aligned with the opening 261 of the inner case 25.

The rotary drive 34 includes a turntable 35 and a spindle motor 341. The turntable 35 rotates with the optical disk 41 set on. The spindle motor 341 as a torque source rotates and drives the turntable 35 (see FIG. 2 or FIG. 3). The turntable 35 has a rotation shaft 351 and a flange 352. The rotation shaft 351 is inserted into a center hole 411 of the optical disk 41. The flange 352 is protruded from the outer circumference of the rotation shaft 351 to support the periphery of an axial hole of the optical disk 41. The optical disk 41 is mounted on the turntable 35 when the optical disk 41 is set on the disk tray 29 and is moved into the inner case 25, the optical disk 41 be set on the turntable 35. A support member 36 bridges over the side wall 27 of the inner case 25. A rotary member 361 is rotatably mounted on the support member 36. The rotary member 361 presses the upper surface of the optical disk 41 (see FIG. 2). Thus, the optical disk 41 is rotated by the drive force of the spindle motor 341, while clamped between the turntable 35 and the rotary member 361.

The movement unit 37 includes a pair of guide shafts 38 and a movement motor 39. The guide shafts 38 are provided such that the axial direction of each guide shaft extends from one edge to another edge of the opening 331 of the base 33. The guide shafts 38 are inserted or engaged in the pickup device 5. The pickup device 5 is moved from one edge to another edge of the base 33 by the drive force of the movement motor 39.

The circuit board 40 lies below the pickup device 5 spaced apart by a predetermined distance from the pickup device 5 (see FIG. 2). The circuit board 40 has 20 electric components that control the rotations of the movement motor 39 and the spindle motor 341, and control the pickup device 5.

Figure 3:
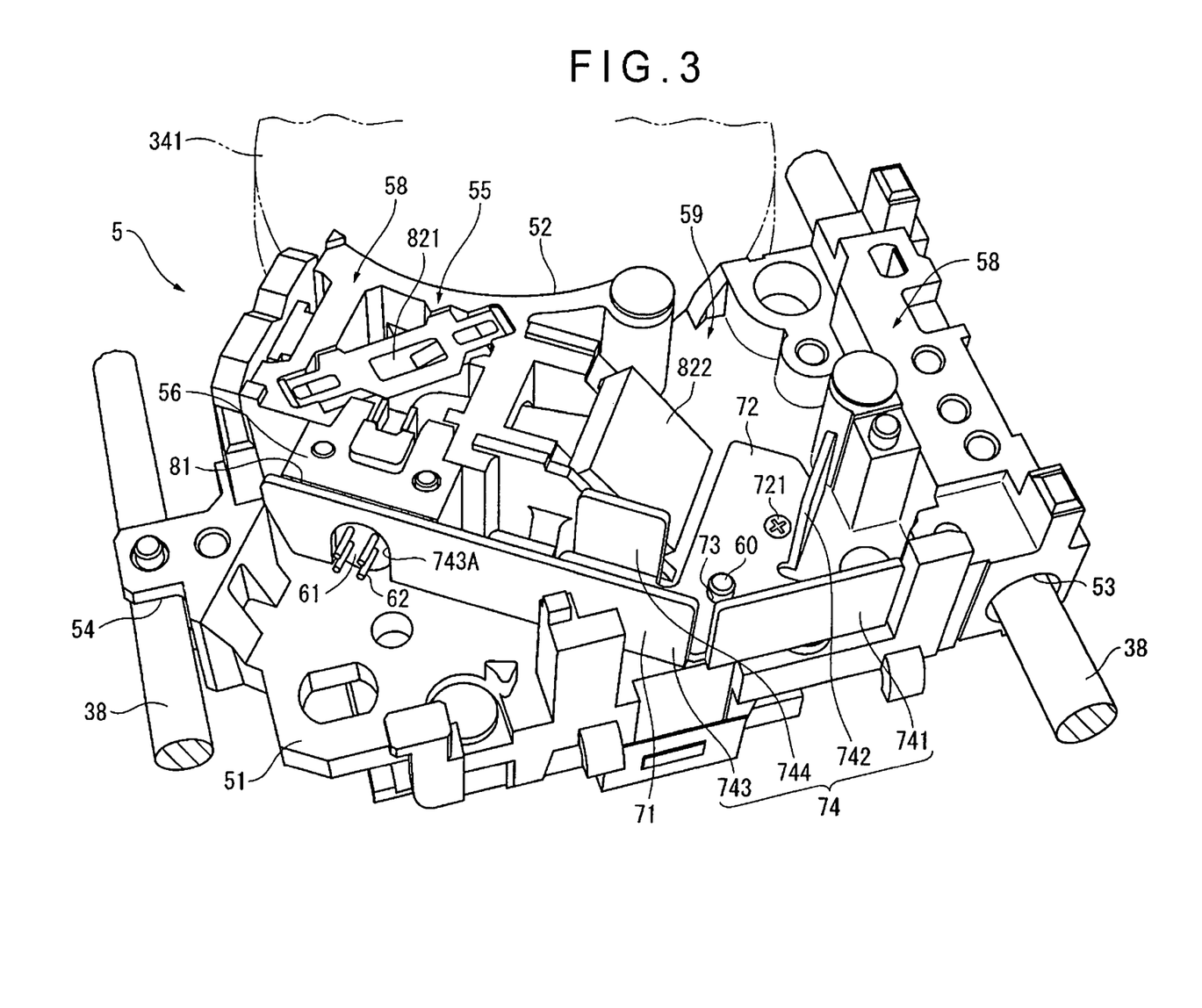
FIG. 3 is a perspective view of the pickup device according to the first embodiment seen from a direction III specified in FIG. 2.

The arrangement of the pickup device 5 will be described in detail. FIG. 3 illustrates the pickup device 5 seen from a direction III specified in FIG. 2.

The pickup device 5 includes a pickup base 51, a laser light source 61, a heat-radiating plate 71, and an optical unit 82. The pickup base 51 is the casing of the pickup device 5. The laser light source 61 is arranged on the pickup base 51 and irradiates a light beam to the optical disk 41. The heat-radiating plate 71 is a member that radiates the heat generated from the laser light source 61. The optical unit 82 is guides the laser beam emitted from the laser light source 61 to the optical disk 41.

The pickup base 51 is an approximately thick plate, an edge of which is formed into an arc 52 to fit the circular shape of the spindle motor 341.

The pickup base 51 has a through hole 53 in the right side of FIG. 3. One of the guide shafts 38 passes through the through hole 53. The pickup base 51 has an engagement part 54 at the left edge. The engagement part 54 has a U-shaped cross section and clamps the other guide shaft 38.

The pickup base 51 has an optical component storage 55 made in one surface (see FIG. 3). The optical component storage 55 accommodates the laser light source 61 and the optical elements. The pickup base 51 has a beam-emitting unit 57 on another surface (see FIG. 2). The beam-emitting unit 57 emits a laser beam toward the optical disk 41. As shown in FIG. 3, the optical component storage 55 is formed on the upper-left corner on one side of the pickup base 51. The optical component storage 55 includes a laser light source receptacle 56 located at the opposite edge of the optical component storage 55. The laser light source receptacle 56 accommodates the laser light source 61. That is, the laser light source receptacle 56 is positioned at a predetermined distance from the spindle motor 341, which is provided at one edge of the pickup base 51 and which rotates the turntable 35.

The pickup base 51 has a step on a surface. The step is defined by, a high-level part 58 and a low-level part 59. The high-level part 58 has, for example, the part on which the through hole 53 is formed on the right edge as shown in FIG. 3 and the optical component storage 55 made in the upper-left corner shown in FIG. 3. The low-level part 59 extends from the lower-left corner shown in FIG. 3, and from another edge to one edge of the right side shown in FIG. 3.

A pin 60 protrudes from the low-level part 59, near one edge of the low-level part 59 on the right side. A bulging part (not shown) is formed on a periphery of the pin 60, having a predetermined height of; for example, about 0.5 mm to about 1.5 mm is higher than the surface of the low-level part 59.

The pickup base 51 is made of synthetic resin or the like.

The laser light source 61 is positioned, with one end exposed outside the laser light source receptacle 56. The laser light source 61 has connector pins 62 on this end. A power cable and other cables can be connected to the connector pins 62. This end of the laser light source 61 is orientated to that corner of the pickup base 51 which is defined by the left side of the pickup base 51 and the other edge thereof. Hence, this end of the laser light source 61 faces away from the turntable 35.

The laser light source 61 includes a DVD laser chip and a CD laser chip. The DVD laser chip outputs a laser beam that reproduces data from DVDs. The CD laser chip outputs a laser beam that reproduces data from CDs. Thus, the laser light source 61 can outputs two laser beams having different wavelengths.

The heat-radiating plate 71 is provided on one surface of the pickup base 51 and radiates the heat generated from the laser light source 61 outside.

The heat-radiating plate 71 is made of iron, stainless steel, aluminum, copper or other metal material. It includes a base part 72 and wall parts 74. The base part 72 extends parallel to the low-level part 59 of the pickup base 51 and is spaced from the low-level part 59 by a predetermined distance. The wall parts 74 are formed integral with the base part 72, protruding upward at almost right angles to the base part 72.

The base part 72 is located at the middle part between one edge to the other edge of the pickup base 51. The base part 72 has a through hole 73, where the pin 60 is inserted. Once the pin 60 is inserted into this through hole 73, the bulging part of the pin 60 supports the base part 72. Thus, the base part 72 is positioned at a predetermined distance from the low-level part 59 of the pickup base 51. The predetermined distance is, for example, about 0.5 mm to about 1.5 mm. The dimension is long enough to facilitate the radiation of heat from the laser light source 61.

The wall parts 74 have an other-edge wall 741, a right-side wall 742, a left-side wall 743, and a one-edge wall 744. The other-edge wall 741 lies near the right side of the pickup base 51 and extends parallel to the other edge of the pickup base 51. The right-side wall 742 lies near the right side of the pickup base 51. The left-side wall 743 linearly extends from the middle part of the other edge of the pickup base 51 toward the middle part of the left side thereof. The one-edge wall 744 extends parallel to the left-side wall 743 and lies closer to one edge of the pickup base 51 than the left-side wall 743.

A part of the left-side wall 743 is readily pressed onto one end of the laser light source 61, with a heat-radiating sheet 81 interposed therebetween, and attached to an end surface of the laser light source 61 with high thermal conductivity. The heat-radiating sheet 81 is an elastic and flexible sheet. A notch 743A, which is formed by cutting, is provided at the left side of the left-side wall 743, through which the connector pins 62 of the laser light source 61 exposed outside.

To secure the heat-radiating plate 71 to the pickup base 51, the pin 60 is inserted into the through hole 73 and the heat-radiating plate 71 is turned clockwise as viewed in FIG. 3. When the heat-radiating plate 71 is so turned, the left-side wall 743 abuts on the laser light source 61, clamping the heat-radiating sheet 81. When the heat-radiating plate 71 is further turned, the left-side wall 743 is then firmly contacted to the laser light source 61 by virtue of the metal elasticity of the heat-radiating plate 71. In the state that the left-side wall 743 is firmly contacted to the laser light source 61, the heat-radiating plate 71 is fixed to the pickup base 51 by a screw 721.

One end of the laser light source 61 faces away from the turntable 35, and the heat-radiating plate 71 remains biased to this end of the laser light source 61. Therefore, the heat-radiating plate 71 is spaced at a predetermined distance from the spindle motor 341, which turns and drives the turntable 35, and is opposite to the spindle motor 341 across the laser light source 61. Further, the circuit board 40 is spaced from the pickup device 5 at the predetermined distance as indicated above. Thus, the circuit board 40 and the heat-radiating plate 71 are spaced apart from each other by a predetermined distance.

The optical unit 82, which guides the laser beam irradiated from the laser light source 61 to the optical disk 41, includes a half mirror 821, a reflection mirror 822 and the like. The half mirror 821 reflects the laser beam from the laser light source 61 at right angle, and the laser beam being parallel to one surface of the pickup base 51. The reflection mirror 822 reflects the reflection light from the half mirror 821 at right angle toward the other surface of the pickup base 51. The laser beam reflected by the reflection mirror 822 toward the other surface of the pickup base 51 is applied to the optical disk 41. The optical unit 82 further includes a detector etc. that detects the reflection light by the optical disk 41.

How the disk apparatus 1 described above reads data from the optical disk 41 constructed in the structure described above will be explained.

The disk tray 29 is pulled out of the outer case 21 and the inner case 25 to set the optical disk 41 on the disk tray 29. The disk tray 29 with the optical disk 41 set on is drawn into the inner case 25. The turntable 35 and the rotary member 361 clamp the optical disk 41. The optical disk 41 is rotated by the rotation of the turntable 35. The pickup device 5 irradiates a laser beam to the optical disk 41. The pickup device 5 detects the reflection light from the optical disk 41, thus reading the data from the optical disk 41. The pickup device 5 is moved by the movement unit 37. While moved, the pickup device 5 irradiates the laser beam to a predetermined part of the optical disk 41. Predetermined data is therefore read from the optical disk 41 sequentially.

How the heat generated by the laser light source 61 is radiated from the pickup device 5 constructed in the structure described above will be described.

The laser light source 61 generates heat while irradiating the laser beam. The heat the laser light source 61 generates is transmitted from one end of the laser light source 61 to the heat-radiating sheet 81. The heat is transmitted from the heat-radiating sheet 81 to the left-side wall 743 of the heat-radiating plate 71. The heat is transmitted from the left-side wall 743 to the base part 72, the one-edge wall 744, the other-edge wall 741 and the right-side wall 742. That is, the heat is transmitted to the entire heat-radiating plate 71. The heat transmitted to the heat-radiating plate 71 is therefore radiated from the exposed part of the heat-radiating plate 71 into the atmosphere. The wall parts 74 of the heat-radiating plate 71 are exposed, each at both surfaces, to the atmosphere. Needless to say, the base part 72 of the heat-radiating plate 71 is exposed to the atmosphere, at the surface facing away from the pickup base 51. Further, the base part 72 is exposed to the atmosphere at the opposing surface, too, because there is a predetermined distance between the surface opposing to the pickup base 51 and the base part 72. That is, approximately all sides of the heat-radiating plate 71 are exposed to the atmosphere. Hence, the heat generated by the laser light source 61 is radiated from almost all sides of the heat-radiating plate 71. The temperature rise of the laser light source 61 is restrained, since the heat generated by the laser light source 61is radiated by the heat-radiating plate 71.

According to the above-described pickup device 5, following advantages can be obtained.

(1) The pickup device 5 includes the pickup base 51, the laser light source 61, and a heat-radiating plate 71. The laser light source 61 is arranged on the pickup base 51 and irradiates the laser beam toward the optical disk 41. The heat-radiating plate 71 has at least one part exposed outside the pickup base 51, is spaced from the pickup base 51 at the predetermined distance, and radiates the heat generated by the laser light source 61.

According to the above arrangement, when the heat that the laser light source 61 generates is transmitted to the heat-radiating plate 71, the heat-radiating plate 71 radiates the heat into the atmosphere. Since the heat-radiating plate 71 is spaced from the pickup base 51 by the predetermined distance, its surface facing the pickup base 51 is exposed to the atmosphere. More precisely, a predetermined space is provided between the pickup base 51 and the base part 72 of the heat-radiating plate 71. The both sides of the base part 72 of the heat-radiating plate 71 are therefore exposed to the atmosphere. In addition, the other-edge wall 741, the right-side wall 742, the left-side wall 743 and the one-edge wall 744 of the heat-radiating plate 71 are exposed to the atmosphere, each at both surfaces. Hence, the heat-radiating plate 71 can radiate the heat to the atmosphere, almost at every side. Conventionally, the heat-radiating plate 71 has firmly contact the pickup base 51 and the part firmly contacting to the pickup base 51 has not exposed to the atmosphere, therefore, no heat could radiate from that side of the heat-radiating plate 71 which firmly contacts the pickup base 51. In the pickup device 5 of the present invention, the heat-radiating plate 71 can radiate the heat from almost every side. Though the amount of radiating heat by the heat-radiating plate 71 increases, the heat-radiating plate 71 can radiate the heat generated by the laser light source 61, with high efficiency. As a result, the temperature rise of the laser light source 61 is restrained. The laser light source 61 can therefore be prevented from being deteriorated in the characteristics and shortened in the lifetime.

Figure 4A:
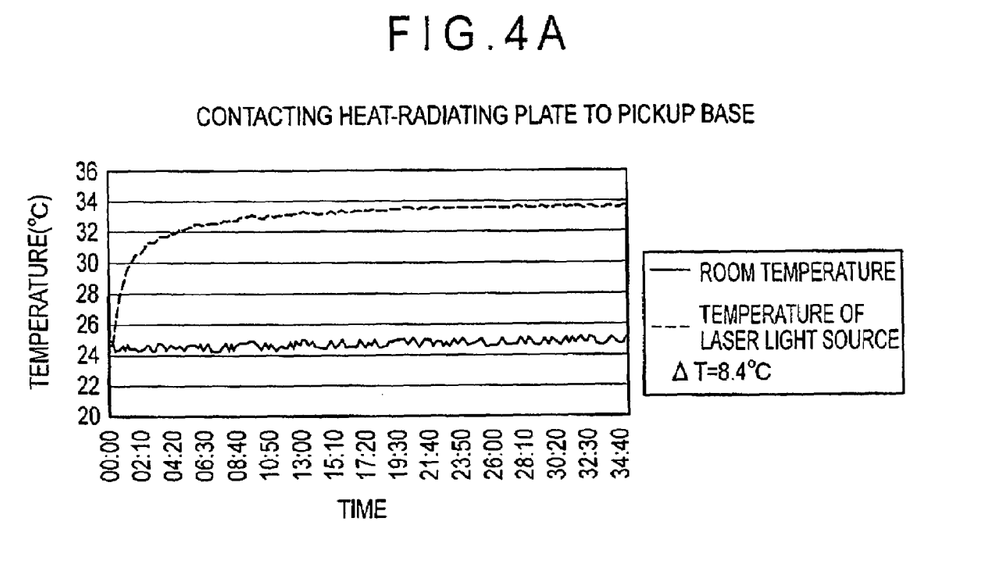
FIG. 4A is a graph illustrating a temperature rise of a laser light source according to heat radiation of a conventional heat-radiating plate.
Figure 4B:
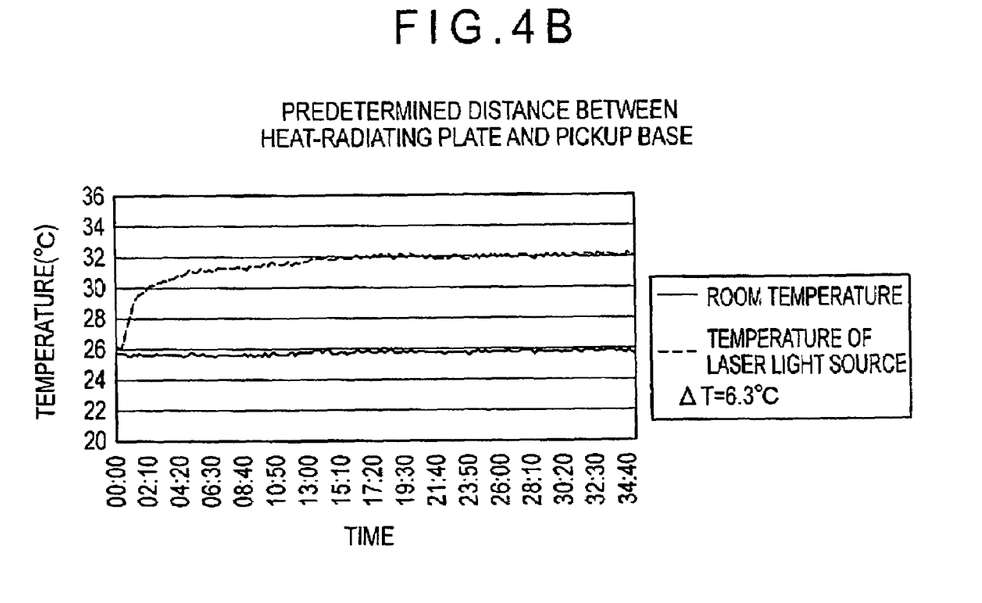
FIG. 4B is a graph illustrating a temperature rise of the laser light source according to heat radiation of the heat-radiating plate, in the first embodiment.

FIG. 4A is a graph that illustrates the temperature rise of the laser light source 61 when the heat-radiating plate 71 firmly contacting the pickup base 51. FIG. 4B is a graph illustrating the temperature rise of the laser light source 61 when the heat-radiating plate 71 is spaced from the pickup base 51 by the predetermined distance of 1 mm. FIG. 4A reveals that the temperature of the laser light source 61 is almost at a constant value of about 33.8° C. when the room temperature is 25° C. The temperature difference between the room temperature and the temperature of the laser light source 61 is about 8.4° C. On the other hand, FIG. 4B shows that the temperature of the laser light source 61 is almost at a constant value of about 32° C., and the temperature difference between the room temperature and the temperature of the laser light source 61 is about 6.3° C. Obviously, the heat-radiating plate 71 that is spaced from the pickup base 51 by a predetermined distance can restrain the temperature rise of the laser light source 61 by about 2° C., compared to the case that the heat-radiating plate 71 firmly contacting the pickup base 51.

Exposed to the atmosphere at every side, the heat-radiating plate 71 exhibits high heat-radiating efficiency. Thus, the heat-radiating plate 71 may be smaller. Then, the pickup device 5 can be smaller. If the heat-radiating plate 71 can be smaller, the material cost can be reduced.

When the heat of the laser light source 61 is transmitted to the heat-radiating plate 71 that is spaced apart by the predetermined distance from the pickup base 51, there is the temperature difference between the heat-radiating plate 71 and the pickup base 51.

More correctly, the pickup base 51 has a lower temperature than the heat-radiating plate 71. A temperature difference, if any, between the pickup base 51 and the heat-radiating plate 71 may be likely to cause air convection. If the air convention develops, the cold air will flow from the outside into the space between the pickup base 51 and the heat-radiating plate 71, and the heat from the sides of the heat-radiating plate 71 is efficiently radiated. By providing the predetermined distance between the pickup base 51 and the heat-radiating plate 71, not only the heat-radiating area is increased, but also the heat-radiating efficiency is enhanced owing to the air convection. Besides, no air-applying unit needs to be particularly provided to cause such air convection. Thus, a relatively simple structure can raise the heat-radiating efficiency.

(2) The heat-radiating plate 71 is located on one side of the pickup base 51, and on the other side of the pickup base 51 relative to the spindle motor 341. Note that the spindle motor 341 rotates the recording part of the optical disk 41. In other words, the heat-radiating plate 71 is provided on the side opposing to the spindle motor 341 across the laser light source 61.

According to the above arrangement, the heat-radiating plate 71 is not exposed to the heat generated by the spindle motor 341. In other words, the hot air exhausted from the spindle motor 341 does not influence the heat-radiating plate 71. Thus, the heat-radiating plate 71 receives no heat that the spindle motor 341 generating, and the heat-radiating plate 71 can efficiently radiate the heat into the atmosphere. The heat-radiating efficiency of the heat-radiating plate 71 therefore does not decrease. The heat-radiating plate 71 can efficiently radiate the heat of the laser light source 61 into the atmosphere.

(3) The heat-radiating plate 71 is spaced from the circuit board 40 having electric components and provided outside the pickup base 51, at such a predetermined distance that it is not exposed to the heat generated by the electric components.

According to the above arrangement, since the heat-radiating plate 71 is not influenced by the heat generated by the electric components of the circuit board 40, the heat-radiating efficiency does not decrease. Thus, the heat-radiating plate 71 can efficiently radiate the heat that the laser light source 61 generates.

(4) The pin 60 protruding from the pickup base 51 is loosely inserted in the through hole 73 provided on the heat-radiating plate 71. The heat-radiating plate 71 can therefore rotate freely around the pin 60. In effect, the heat-radiating plate 71 rotates around the pin 60, having one part of the heat-radiating plate 71 biased onto one end of the laser light source 61.

According to the above arrangement, since the heat-radiating plate 71 is firmly pressed onto the laser light source 61, the heat generated by the laser light source 61 can be readily transmitted to the heat-radiating plate 71. Hence, the heat-radiating plate 71 can efficiently radiate the heat that the laser light source 61 generates.

After the heat-radiating plate 71 is engaged with the pickup base 51 with inserting the pin 60 into the through hole 73, screwing by the screw 721 is simply needed to fasten the beat-radiating plate 71 to the pickup base 51. The pickup device 5 simple in structure and easy to assemble, compared to such case that another biasing member for attaching the heat-radiating plate 71 onto the laser light source 61 is provided, in addition to a fastening member for fastening the heat-radiating plate 71 to the pickup base 51.

(5) The heat-radiating sheet 81 is provided between the one end surface of the laser light source 61 and the heat-radiating plate 71.

According to the above arrangement, the heat-radiating plate 71 contacts the heat-radiating sheet 81. And the end surface of the laser light source 61 contacts the heat-radiating sheets 81. When the laser light source 61 and the heat-radiating plate 71 contact each other without the heat-radiating sheet 81, i.e., two rigid components contact each other, they likely to contact at a point, not in a plane. As a contacting area of the laser light source 61 and the heat-radiating plate 71 being smaller, the less heat would be transmitted from the laser light source 61 to the heat-radiating plate 71. Nonetheless, the contacting area is sufficiently enlarged because the heat-radiating sheet 81 interposed between the laser light source 61 and the heat-radiating plate 71. As a result, heat is efficiently transmitted from the laser light source 61 to the heat-radiating plate 71.

(6) The pickup base 51 has the high-level part 58 and the low-level part 59, and the heat-radiating plate 71 is arranged on the low-level part 59.

Hence, the heat-radiating plate 71 is spaced from the circuit board 40 by a long distance.

The heat-radiating plate 71 is spaced from the pickup base 51 by the predetermined distance. On the other hand, the circuit board 40 opposes the one surface of the pickup base 51. It follows that the heat-radiating plate 71 may lie close to the circuit board 40, because the heat-radiating plate 71 is spaced from the pickup base 51 by the predetermined distance. Nevertheless, the heat-radiating plate 71 can be sufficiently spaced from the circuit board 40 even though the heat-radiating plate 71 is spaced from the pickup base 51, since the low-level part 59 is provided on the pickup base 51, and the heat-radiating plate 71 is arranged on the low-level part 59.

(7) The pickup base 51 is made of synthetic resin. The material cost of the pickup base 51 is therefore lower than the case that the pickup base 51 is made of metal. Made of synthetic resin, the pickup base 51 is hard to radiate the heat compared to the pickup base 51 being made of metal. Nonetheless, the heat-radiating plate 71 can alone sufficiently radiate the heat generated by the laser light source 61.

(8) The laser light source 61 can emit the two laser beams of the different wavelengths. Therefore, the pickup device 5 can be smaller than in the case having two individual lasers, the one for emitting a laser beam to reproduce data from DVDs and the other for emitting the laser beam to reproduce data from CDs. The laser light source 61, which can emits two laser beams of different wavelengths, could generate much heat. Nonetheless, the heat-radiating plate 71 can sufficiently radiate the heat of the laser light source 61.

(Second Embodiment)

Figure 5:
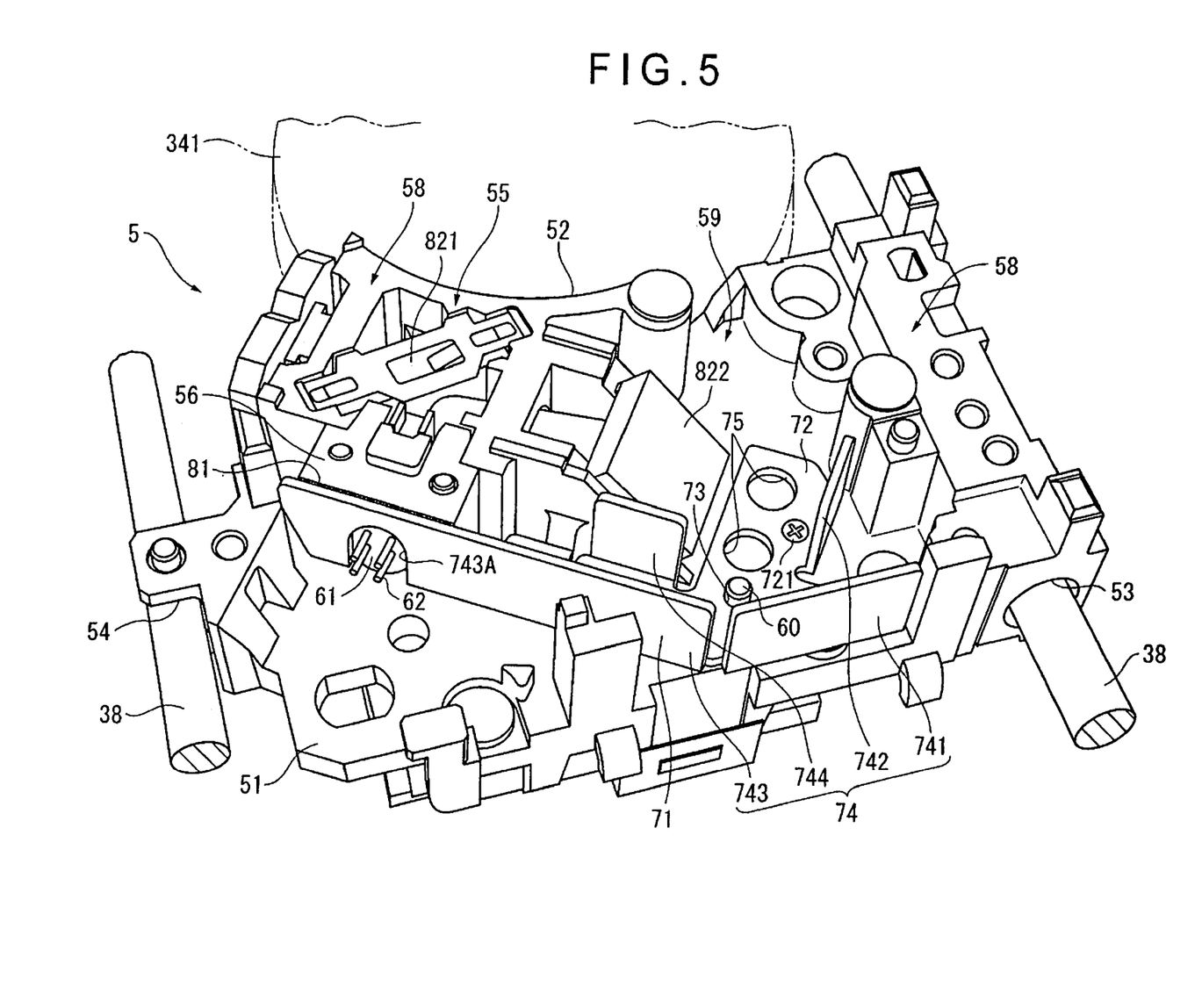
FIG. 5 is a perspective view of a pickup device according to a second embodiment of the present invention.

A second embodiment of the present invention will be described with reference to FIG. 5.

The basic structure of the second embodiment is similar to the first embodiment. It is characterized in that the base part 72 of the heat-radiating plate 71 has hear-radiating holes 75.

The heat-radiating holes 75 is arranged in the base part 72 of the heat-radiating plate 71, connecting the space which is sandwiched between the base part 72 of the heat-radiating plate 71 and the pickup base 51, and the space on the other side across the base part 72.

According to the above arrangement, the second embodiment can achieve not only the advantages (1) to (8) of the first embodiment, but also the following advantages:

(9) The heat-radiating plate 71 is spaced from the pickup base 51 by the predetermined distance. The space between the one side of the pickup base 51 and the heat-radiating plate 71 communicates with the space on the other side of the base plate 51, via the heat-radiating holes 75 made in the heat-radiating plate 71.

In a case that the air convection occurs between the pickup base 51 and the base part 72 of the heat-radiating plate 71 due to the temperature difference between them, the air can easily flow into the space between the pickup base 51 and the base part 72, through the heat-radiating holes 75. Thus, the heat-radiating plate 71 can readily contact the cold air, thereby enhancing the heat-radiating efficiency of the heat-radiating plate 71.

Figure 6:
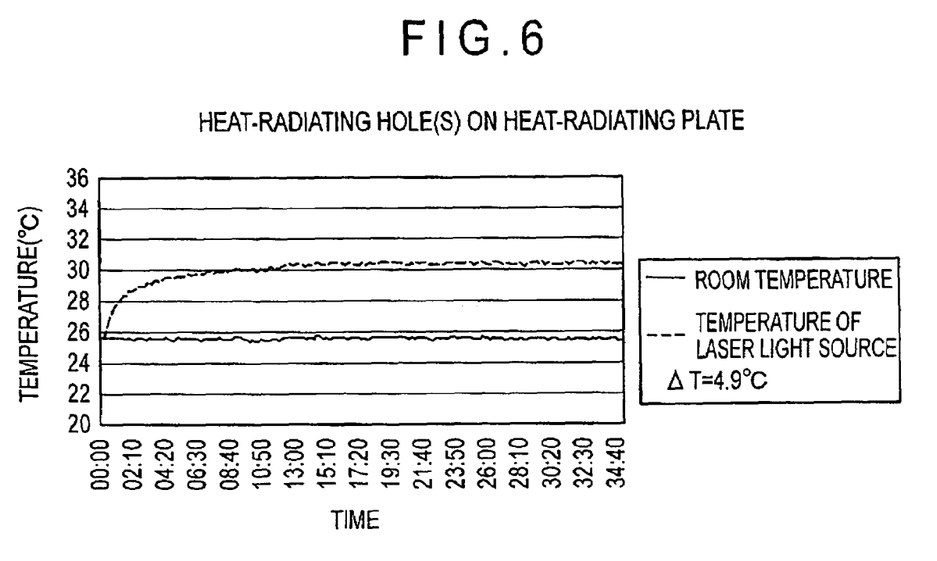
FIG. 6 is a graph illustrating a temperature rise of the laser light source according to heat radiation of the heat-radiating plate, in the second embodiment.

FIG. 6 is a graph showing the temperature rise of the laser light source 61 in the case where the heat-radiating plate 71 is spaced from the pickup base 51 by 1 mm, and the heat-radiating plate 71 has the heat-radiating holes 75. As seen from FIG. 6, the temperature of the laser light source 61 is almost constant at about 30° C. when the room temperature is 25° C. The temperature rise of the laser light source 61 is about 3.5 C. less than in the conventional pickup device wherein the heat-radiating plate 71 contacts the pickup base 51 shown in FIG. 4A.

(Modification)

Incidentally, the pickup device according to the present invention is not limited to the embodiments described above, but includes various changes and modifications as long as an object the present invention can be attained.

The pickup base 51 and heat-radiating plate 71 are not limited to have shapes according to the above-described embodiments, but various shapes can be employed. Further, the laser light source 61 is not limited to one that can emit two laser beams of different wavelengths.

The heat-radiating holes 75 are not limited in terms of shape, number, size and the like. The heat-radiating hole or holes 75 may, of course, be provided at the wall parts 74 of the heat-radiating plate 71. If too many heat-radiating holes 75 are made in the heat-radiating plate 71, the area of the heat-radiating plate 71 may be smaller; moreover, the heat-radiating plate 71 will have a smaller heat-transmitting area to transmit the heat. Consequently, the heat-radiating plate 71 will have a lower heat-radiating efficiency. In view of this, it is important to make an appropriate number of heat-radiating holes 75 in the wall parts 74. In the embodiments described above, the pickup base 51 has the pin 60 thereon and the heat-radiating plate 71 has the through hole 73, in which the pin 60 is inserted. Alternatively, the heat-radiating plate 71 may have the pin 60 and the pickup base 51 may have the through hole 73.

What is claimed is:

1. A pickup device comprising:
   a casing;
   a light source provided in the casing to irradiate a light beam to an optical recording medium; and
   a heat-radiating member having at least one part exposed outside the casing, and being spaced from the casing by a predetermined distance to radiate heat generated by the light source,
   wherein:
   the heat-radiating member and the casing are rotatably provided by loosely inserting a pin, which is arranged at one of the heat-radiating member or casing, into a hole, which is arranged at the other of the heat-radiating member or casing, and
   a part of the heat-radiating member is biased onto one end surface of the light source in accordance with the rotation around the pin.

2. The pickup device according to claim 1, wherein the heat-radiating member has a communicating hole which communicates with a space, which is between the casing and the heat-radiating member, and an opposing side across the heat-radiating member, by having the predetermined distance between the casing and the heat-radiating member.

3. The pickup device according to claim 1, wherein the heat-radiating member is located on one side of the casing, and another side of the casing relative to a drive source for rotating a recording surface of the optical recording medium.

4. The pickup device according to claim 3, wherein the heat-radiating member is arranged, opposing the drive source for rotating across the light source.

5. The pickup device according to claim 1, wherein the heat-radiating member is spaced from a circuit board provided outside the casing and having electric components, by a predetermined distance long enough not to be exposed to the heat generated from the electric components.

* * * * *